United States Patent [19]

Bacehowski et al.

[11] 4,417,753

[45] Nov. 29, 1983

[54] METHOD AND APPARATUS FOR JOINING MATERIALS

[75] Inventors: David Bacehowski, Wildwood; Paul Measells, Libertyville; Kenneth Zabielski, McHenry, all of Ill.

[73] Assignee: Baxter Travenol Laboratories, Inc., Deerfield, Ill.

[21] Appl. No.: 265,933

[22] Filed: May 21, 1981

[51] Int. Cl.$^3$ ............................................. F16L 13/02
[52] U.S. Cl. .................................. 285/21; 156/272.2; 156/293; 156/294; 156/309.3; 156/310; 156/313; 156/314; 285/423
[58] Field of Search ................. 156/73.1, 272.2, 293, 156/294, 309.3, 310, 304.2, 304.3, 313, 314; 285/15, 21, 31, 32, 291, 381, 423, DIG. 16; 403/179, 185, 192, 270, 280, 286, 292, 345, 377, 405, 408; 428/411, 480

[56] References Cited

U.S. PATENT DOCUMENTS

| | | | |
|---|---|---|---|
| 3,143,364 | 8/1964 | Klein | 156/294 |
| 3,476,408 | 11/1969 | Wolfe | 285/21 |
| 3,519,158 | 7/1970 | Anderson | 215/37 |
| 3,528,457 | 9/1970 | Martin et al. | 138/132 |
| 3,561,493 | 2/1971 | Maillard | 138/141 |
| 3,650,775 | 3/1972 | Simon et al. | 99/174 |
| 3,677,845 | 7/1972 | Roberts | 156/313 |
| 3,741,253 | 6/1973 | Brax et al. | 138/137 |
| 3,903,351 | 9/1975 | Ando et al. | 156/313 |
| 3,945,867 | 3/1976 | Heller, Jr. et al. | 156/143 |
| 4,000,760 | 1/1977 | Heller, Jr. et al. | 138/141 |
| 4,112,989 | 9/1978 | Grode et al. | 150/1 |
| 4,178,401 | 12/1979 | Weinberg et al. | 428/35 |
| 4,251,310 | 2/1981 | Goldhaber et al. | 156/308.2 |
| 4,289,337 | 9/1981 | Roe | 285/DIG. 16 |

Primary Examiner—Caleb Weston
Attorney, Agent, or Firm—Paul C. Flattery; John A. Caruso; Garrettson Ellis

[57] ABSTRACT

A method and apparatus for joining sealingly incompatible plastic materials is disclosed. A coextruded connector (10) with separate, telescopically related layers (12,14) is affixed to one of the materials. The outer layer (14) of connector (10) is composed of a polymer specifically selected to melt or deform at a temperature lower than that of inner layer (12). The connector is frictionally fit within a second material to be joined and the connection is heated to a temperature sufficient to melt or deform outer layer (14) without melting inner layer (12). Outer layer 14 is thereby securely fused to the second material or blood container.

A secondary embodiment is disclosed for joining materials of similar composition. Two coextruded connectors (40,46), having telescopically related layers composed of different polymer materials, are formed, as above, but the layer sequence of each connector is opposite to the other. The connectors (40,46) are sized to frictionally fit one within the other and the layers (42,48) in facing contact are composed of a material selected to melt or deform at a temperature lower than the nonfacing layers (44,50). For joining, the connectors (40,46) are affixed to the materials to be joined and then fit one within the other. The connection is then heated to a temperature sufficient to cause the lower melting, facing layers (42,48) to fuse together.

15 Claims, 6 Drawing Figures

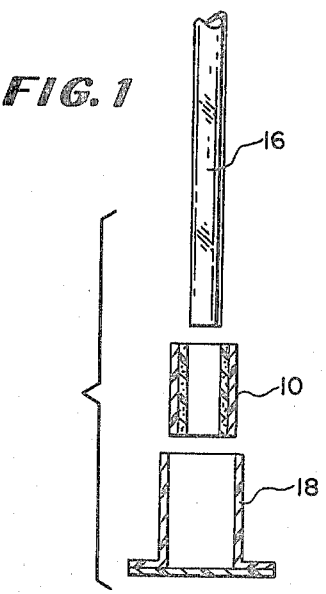
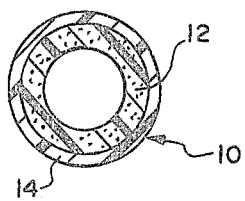
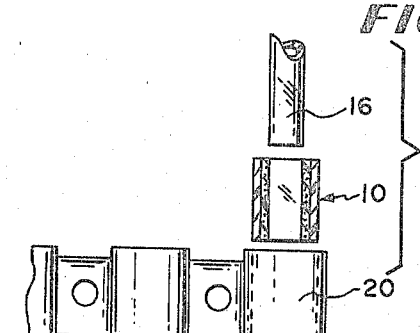
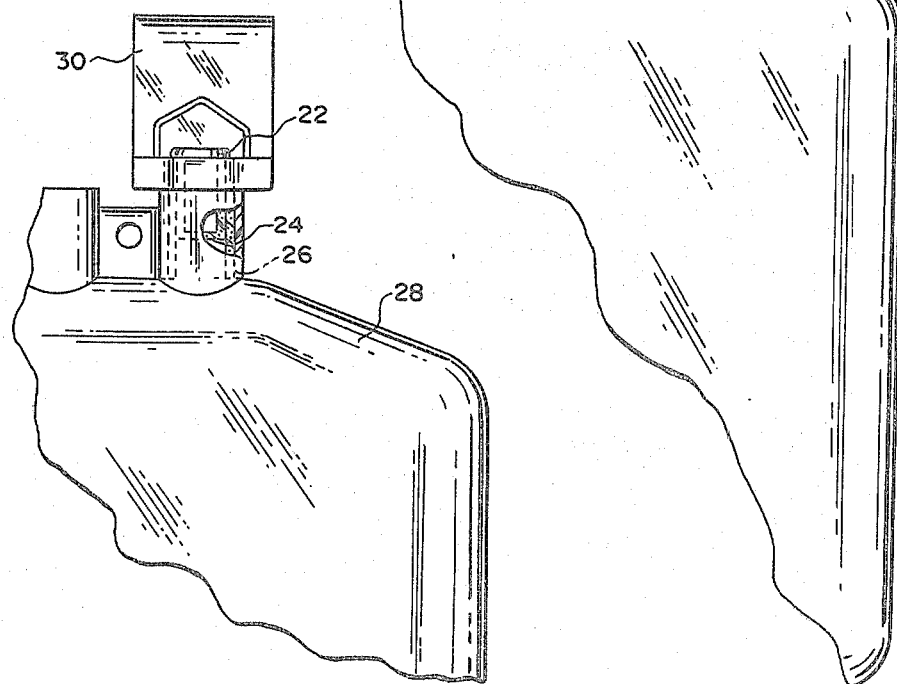

METHOD AND APPARATUS FOR JOINING MATERIALS

TECHNICAL FIELD

The invention of this application relates, in general, to a connector specifically adapted for connecting together different plastic materials. It is particularly desirable for attaching flexible tubing to a medical container, such as a blood bag, where the tubing and the blood bag are composed of materials incompatible for sealing directly together.

A secondary use is for the solventless connecting of similar materials by heating, where sufficient heating to connect the materials directly might be undesirable.

The specific invention makes use of a coextruded or co-injection molded multi-layered connector of different plastics, where one of the layers is particularly adapted to melt at a lower temperature than the other. This permits mechanical heat-sealing of various medical plastic items by fusion of one of the layers with the desired item where it would not be desirable to join them directly.

BACKGROUND AND SUMMARY OF THE INVENTION

Flexible containers for the storage of blood or other medical fluids composed from blow-molded polyolefin polymers are generally well known. One current formulation for blood containers is disclosed in Gajewski et al., U.S. Pat. No. 4,140,162, assigned to the present assignee. It is desirable to attach to such blood containers flexible donor tubing and flexible port tubes composed basically of polyvinyl chloride (PVC). Such tubing, however, is sealingly incompatible with the polyolefin polymer of the bag itself. Therefore, some intermediate method or connector is necessary to effectively join the tubing to the blood container.

One method and an adaptor for accomplishing this is shown in Kwong et al., Ser. No. 067,068, a pending application assigned to the present assignee. Kwong uses a particularly designed adaptor, composed of a single material, as an intermediate link between the container and the tubing. The tubing and the container are respectively mechanically sealed to the adaptor and the connection between the two thus effected. The present invention seeks another method for sealing the dissimilar materials using a different type of connecting element.

The solution of the present invention is basically to utilize a small connector or bushing comprising two separate and distinct layers of different polymers, one coextruded or co-injection molded over the other. In the preferred embodiment, the inner layer is composed of polyvinyl chloride while the outer layer is composed of a lower melting polymer capable of being compatibly sealed or melted to the polyolefin container, such as poly(ethyl-vinyl acetate) (EVA).

To effect the connection, the polyvinyl chloride tubing or port tube is first sealed within the two-layered connector, with the PVC layer of the connector bonded to the PVC tubing, by any conventional means such as solvent sealing with cyclohexanone. The tubing or tube with connector attached is then cleaned and prepared for insertion in the polyolefin blood container. The connector is placed within the blow-molded opening in the polyolefin container and held in place by a frictional fit. The container with connector and tubing attached is then heated to a temperature sufficient to cause the EVA layer of the connector to melt and fuse with the polyolefin container, forming a solid secure seal.

One convenient method of effecting this heating is to place the unit prior to sealing into a conventional sterilization apparatus and autoclaving it to sterilization temperature. This operation combines two functions; namely, sterilizing the entire system prior to use, and heating the connection to a temperature sufficient to cause the EVA layer of the connector and the polyolefin container to fuse together.

An alternative method of heating the EVA layer is to use a radio frequency sealing technique, bombarding the EVA-polyolefin connection with sufficient radio waves to cause the EVA to melt, and the pieces to fuse together.

The connector may be formed from conventional formulations of plasticized polyvinyl chloride and EVA using standard plastic coextrusion equipment. The two plastic formulations are appropriately charged into a conventional screw coextrusion system, and extruded at a temperature of about 300° to 350° F. The layered plastics come from the extruder as a length of tubing which, upon cooling, is cut into connectors or bushings of appropriate length. The multi-layered tubing for making the connectors may also be co-injection molded using standard co-injection molding equipment.

Preferably, the EVA outer layer of the connector is substantially thinner than the polyvinyl chloride inner layer since not as much EVA is needed to effect the heat seal and shrinking or other undesirable deformation of the EVA layer is minimized.

In a variation of the present invention, the port itself may be coextruded from EVA and PVC, as the connector above, and the port sealed within the polyolefin container as disclosed in the present invention. A conventional PVC port protector may then be sealed around the tube port.

In the handling of a medical product, container, or apparatus it is frequently desirable to exclude possibly contaminating solvents or other agents from the fabrication process. In a second embodiment of the present invention, the same coextrusion technology may be used to effect a solventless seal between containers of similar materials, such as polyvinyl chloride.

Two coextruded connectors, similar to that described above, are utilized. The sequence of polymer layers of each, however, is reversed, one from the other. In this case, one connector has an outer layer composed of PVC and an inner layer of EVA. A second connector or bushing, appropriately sized to fit snugly within the first connector, is extruded with the layers reversed; that is, the outer layer is EVA and the inner layer PVC.

The respective PVC layers of each connector are sealed to the corresponding PVC items which are to be joined. This sealing may be accomplished by conventional solvent sealing means, radio frequency sealing or other method.

For final assembly, the connectors are frictionally fit one within the other, EVA layer to EVA layer. The united connectors are then heated by conventional heat-sealing means, by radio frequency sealing, or other means, to a sufficient temperature to cause the EVA layers to melt and fuse together forming a solid bond.

This method for sealing like materials together using multi-layered connectors has the additional advantage, in addition to solventless sealing at time of final assembly, of accomplishing the heat-sealing at a lower temperature than necessary to seal PVC to PVC. This avoids or prevents any potential decomposition or deformation of the PVC at temperatures sufficient to fuse them directly.

DESCRIPTION OF THE DRAWINGS

FIG. 1 is an exploded, longitudinal, view of a connector of the present invention and a port member to which it is affixed.

FIG. 2 is a transverse, cross-sectional view of the connector of FIG. 1.

FIG. 3 is an exploded, longitudinal, cross-sectional view of the coextruded or co-injection molded connector of this invention joined to the port of a conventional flexible container.

FIG. 4 is a sectional, elevational view of a tube port on a conventional flexible container sealed by the method of this invention.

DETAILED DESCRIPTION OF THE INVENTION

Figure 5:
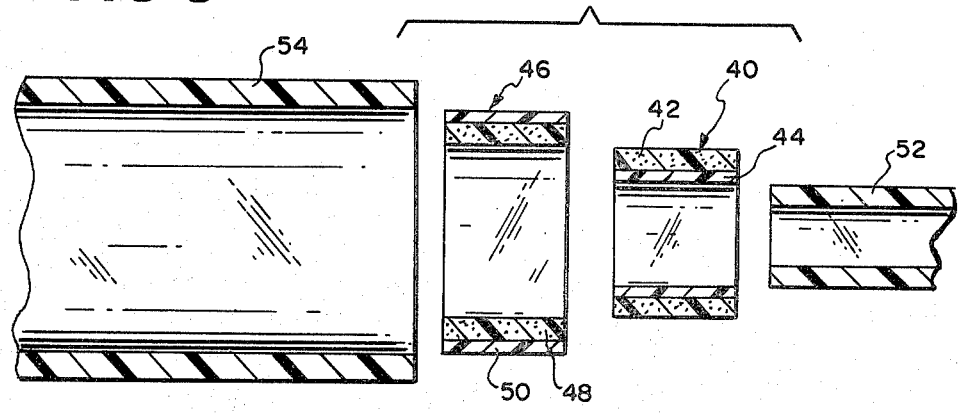
FIG. 5 is an exploded, cross-sectional, transverse view of another embodiment of a connector of this invention.

Referring to FIG. 2, a transverse sectional view of the connector of this invention is disclosed. A connector 10 defines telescopically related inner cylindrical layer 12 and outer cylindrical layer 14. Connector 10 is formed from the coextruded or co-injection molded, multiple layered tubing, described below, which is cut into appropriate connector sized sections. Inner layer 12 is composed of a polymer compatible with flexible tubing 16, shown in FIG. 1.

Conventional tubing 16 is ordinarily made from polyvinyl chloride, and therefore, inner layer 12 is also preferably fabricated from PVC. Outer layer 14 is composed of a polymer or other material meltable or deformable at a temperature less than that of inner layer 12, and which is sealingly compatible with port or other plastic member 18.

In the present embodiment, port 18, or the blow-molded port 20 of FIG. 3 to which outer layer 14 may also be bonded, is composed of a polyolefinic material consisting of propylene units as a first component and containing poly(ethyl-vinyl acetate) units as a secondary component. The outer layer 14 is, therefore, preferably composed of poly(ethyl-vinyl acetate) which is easily fused to the port 18 material.

To effect the connection, PVC tubing 16 is sealed to inner layer 12 within connector 10 by any conventional means such as solvent sealing with cyclohexanone. The connector tubing connection is then permitted to set and is cleaned or otherwise prepared for insertion in ports 18 or 20. The connector 10 is of a diameter such that it frictionally fits within either of ports 18 or 20 and thereby held in place prior to final assembly.

The tubing-connector-port assembly is then heated to a temperature sufficient to cause the EVA of outer layer 14 to melt and fuse together with ports 18 or 20.

The heating may be done in a variety of ways, using a variety of heating sources such as radiant, conductive, or convection energy. One preferable method includes the tubing-connector-port assembly and placing the assembly within a conventional steam sterilizer or autoclave. The assembly is then permitted to rise to sufficient temperature to sterilize the unit. This temperature is also sufficient to cause the EVA outer layer 14 to melt and fuse the connector and tubing to ports 18 or 20. Alternatively, the assembly may be either heated by conventional heat-sealing means, or subjected to radio frequency waves heating the assembly to sufficient temperature to effect the seal.

It is also to be understood that the invention may be practiced with the tubing 16 sized to fit over, rather than inside, the connector 10 which in turn is fit around, rather than inside, the container port 18. In this case the connector layer sequence is reversed. In the present invention the outer layer 14 would be composed of PVC, while the inner layer 12 is composed of EVA.

Alternatively as shown in FIG. 4, a port tube 22, used for the connection of other tubing or medicaments by insertion of a cannular connector attached to the tubing, through diaphragm 24, may be fabricated from coextruded or co-injected molded tubing. The tube port 22 itself is then sealed within the port opening 26 of a conventional flexible container 28 using the method disclosed above. A vinyl port protector 30 is then sealed around port tube 22 to protect it prior to opening of the port 22.

The connector shown in FIG. 2 has an outer diameter of approximately 0.25 inch (0.635 cm.), and an inner bore of 0.125 inch (0.317 cm.). The outer layer 14 has a preferred radial thickness of approximately 0.03 inch (0.075 cm.), while the radial thickness of inner layer 12 is preferably about 0.095 inch (0.2375 cm.). The difference in preferred thicknesses between inner layer 12 and outer layer 14 is due to a smaller requirement of polymer for outer layer 14 and the desirability that outer layer 14 not fuse or deform in such a manner as to weaken the resulting seal or deform the connection.

Figure 6:
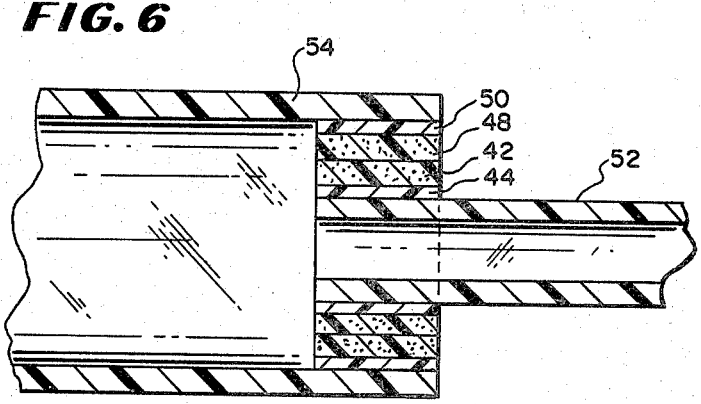
FIG. 6 is a transverse, cross-sectional view of the connector of FIG. 5 in a sealed relationship.

In a secondary embodiment, as illustrated in FIGS. 5 and 6, the joining of items such as tubing or ports composed of similar materials may be facilitated using a similar method and apparatus as that detailed above.

To effect a heat-seal between similar materials at a temperature or using energy less than that required to fuse the materials directly, a connector 40 is fabricated from coextruded or co-injection molded tubing as detailed in the first embodiment. Connector 40 has a lower-melting polymer outer layer 42 coextruded over a higher-melting polymer inner layer 44.

In addition, a second connector 46 is similarly fabricated with the sequence of layers reversed; i.e. the lower melting layer 48 is on the inside of the connector 46, while the higher melting layer 50 is outside. As before, the lower melting layer in each connector is preferably composed of poly(ethyl-vinyl acetate) and the higher melting layer of polyvinyl chloride. Also, the second connector 46 has an inside diameter sized to permit first connector 40 to be frictionally fit within it.

To effect the seal, each of the PVC layers of the respective connectors 40, 46 is sealed to the PVC tubing 52 or connector 54 that are to be joined together. The seal is by any conventional means such as solvent sealing with cyclohexanone or by radio frequency sealing. The items to be joined are then cleaned or otherwise prepared for joining.

Connector 40 is then frictionally fit within connector 46, with their respective EVA layers 42, 48 adjacent each other. The assembly is heated by conventional heat-sealing means, by autoclaving in a sterilizer or by subjecting the connection to radio frequency waves sufficient to cause the EVA layers 42, 48 to melt and fuse, one into the other.

The resulting connection demonstrates firm adhesion and bonding using sealing temperatures less than those necessary to directly bond the PVC. This lower temperature preventing possible deterioration or other structural problems which may result at the elevated temperatures.

The above has been offered for illustrative purposes only, and is not intended to limit the scope of this application which is defined in the claims below.

What is claimed is:

1. A method for joining materials comprising:
fusing a first thermoplastic material to a first layer of a connector, said connector having telescopically related first and second layers, said layers being made of essentially different thermoplastic components, the primary component of said second layer being selected to melt or deform at a lower temperature than said first layer, and;
fusing said connector to a second thermoplastic material, by heating said connector to a temperature sufficient to melt or deform said second layer without melting or deforming said first layer, whereby, said second layer bonds to said second thermoplastic material.

2. A method for joining materials as claimed in claim 1, wherein said first layer is essentially composed of polyvinyl chloride and said second layer is essentially composed of poly(ethyl-vinyl acetate).

3. A method for joining materials as claimed in claim 1 wherein said first material is essentially composed of polyvinyl chloride and said second material is a polymer selected from the group consisting of polyolefin; polyolefin/poly(ethyl-vinyl acetate) copolymer; polyethylene, and a combination thereof.

4. A method for joining materials as claimed in claim 1 wherein said first material is fused to said first layer by solvent bonding.

5. A method for joining materials as claimed in claim 1 wherein said connector is fused to said second thermoplastic material by heat using radio frequency energy.

6. A connector for joining sealingly incompatible thermoplastic materials comprising telescopically related first and second cylindrical layers, said first layer and said second layer comprised of thermoplastic polymers selected to melt or deform at different temperatures, said first layer being capable of fusing to a first thermoplastic material, and said second layer being capable of fusing to a second thermoplastic material sealingly incompatible with said first material.

7. A connector for joining materials as claimed in claim 1, wherein said first layer is essentially composed of polyvinyl chloride and said second layer is essentially composed of poly(ethyl-vinyl acetate).

8. A connector for joining materials as claimed in claim 1, wherein said first material is essentially composed of polyvinyl chloride and said second material is a polymer selected from the group, polyolefin, polyolefin/poly(ethyl-vinyl acetate) copolymer, polyethylene and a combination thereof.

9. A connector as claimed in claim 6 wherein said first layer is capable of being fused to said first material by solvent bonding means.

10. A connector as claimed in claim 1 wherein said outer layer is capable of being sealed to said second material by heating and fusing together of said outer layer and said second material.

11. A method for joining materials by heat sealing comprising:
fusing a first thermoplastic material to a first connector, said first connector having telescopically related inner and outer layers, said layers being composed of essentially different thermoplastic components, the primary component of said outer layer being selected to melt or deform at a lower temperature than said inner layer;
fusing a second thermoplastic material to a second connector, said second connector having telescopically related inner and outer layers, said layers being composed from essentially different components, the primary component of said inner layer being selected to melt or deform at a lower temperature than said outer layer, said first connector being sized to fit within and in contact with said second connector;
fitting said first connector within said second connector such that the outer layer of said first connector and the inner layer of said second connector are in facing contact with each other;
fusing the outer layer of said first connector to the inner layer of said second connector by heating said first and second connectors to a temperature sufficient to melt or deform said layers in facing contact, whereby the layers bond together.

12. A method for joining materials as claimed in claim 1 wherein said first material and said second material are essentially composed of polymers selected from the group consisting of polyvinyl chloride, polyolefin, polyethylene, polyolefin/poly(ethyl-vinyl acetate) copolymer, and a combination thereof.

13. A method for joining materials as claimed in claim 1 wherein the outer and inner layers of said first connector are essentially composed of poly(ethyl-vinyl acetate) and polyvinyl chloride respectively; and
the outer and inner layers of said second connector are essentially composed of polyvinyl chloride and poly (ethyl-vinyl acetate) respectively.

14. A method for joining materials as claimed in claim 1 wherein said fitted connectors are heated to said sufficient temperature by autoclaving.

15. A method for joining materials as claimed in claim 1 wherein said fitted connectors are heated to said sufficient temperature by radio frequency energy.

* * * * *